United States Patent
Leigh et al.

(10) Patent No.: US 9,354,401 B2
(45) Date of Patent: May 31, 2016

(54) OPTICAL CONNECTOR HAVING A CLEANING ELEMENT

(71) Applicant: HEWLETT-PACKARD DEVELOPMENT COMPANY, L.P., Houston, TX (US)

(72) Inventors: Kevin B. Leigh, Houston, TX (US); George D. Megason, Spring, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/650,548

(22) PCT Filed: Jan. 30, 2013

(86) PCT No.: PCT/US2013/023772
§ 371 (c)(1),
(2) Date: Jun. 8, 2015

(87) PCT Pub. No.: WO2014/120143
PCT Pub. Date: Aug. 7, 2014

(65) Prior Publication Data
US 2015/0323747 A1    Nov. 12, 2015

(51) Int. Cl.
*G02B 6/38* (2006.01)

(52) U.S. Cl.
CPC ............... *G02B 6/3866* (2013.01); *G02B 6/38* (2013.01); *G02B 6/3853* (2013.01); *Y10T 29/49842* (2015.01)

(58) Field of Classification Search
CPC ...... G02B 6/32; G02B 6/3821; G02B 6/3887; G02B 6/4204; G02B 6/4292; G02B 6/4206

USPC ........................ 385/61, 93; 359/507, 511, 512
See application file for complete search history.

(56) References Cited

U.S. PATENT DOCUMENTS

| 5,475,215 A | 12/1995 | Hsu |
| 5,604,345 A | 2/1997 | Matsuura |
| 5,940,560 A | 8/1999 | De Marchi et al. |
| 6,545,808 B1 | 4/2003 | Ehbets et al. |
| 7,408,601 B1 | 8/2008 | Huang et al. |
| 7,474,396 B2 | 1/2009 | Wu et al. |
| 7,526,159 B2 | 4/2009 | Haney et al. |
| 8,781,276 B2 | 7/2014 | Fattal et al. |
| 8,983,248 B2 | 3/2015 | Sorin |
| 2004/0114642 A1 | 6/2004 | Bullington et al. |

(Continued)

FOREIGN PATENT DOCUMENTS

| CN | 101251655 A | 8/2008 |
| CN | 101902276 A | 12/2010 |

(Continued)

OTHER PUBLICATIONS

Berdinskikh, T. et al., NThA6.pdf, Accumulation of Particles Near the Core During Repetitive Fiber Connector Matings and De-matings, 2006 Optical Society of America (11 pages).

(Continued)

*Primary Examiner* — Ellen Kim
(74) *Attorney, Agent, or Firm* — Trop, Pruner & Hu, P.C.

(57) ABSTRACT

An optical connector includes a lens assembly that has at least one lens and a surface. A cleaning element is provided to clean the surface or a surface of another optical connector.

19 Claims, 12 Drawing Sheets

(56) References Cited

U.S. PATENT DOCUMENTS

| | | |
|---|---|---|
| 2007/0200946 A1 | 8/2007 | Onozawa et al. |
| 2007/0206287 A1 | 9/2007 | Tsukamoto |
| 2007/0284510 A1 | 12/2007 | Li et al. |
| 2008/0137161 A1 | 6/2008 | Roichman et al. |
| 2008/0193080 A1 | 8/2008 | Cheben et al. |
| 2009/0020690 A1 | 1/2009 | Toda |
| 2009/0290836 A1 | 11/2009 | Lee et al. |
| 2010/0126577 A1 | 5/2010 | Wu et al. |
| 2011/0083739 A1 | 4/2011 | Peng et al. |
| 2012/0063721 A1 | 3/2012 | Chen |
| 2012/0063725 A1 | 3/2012 | Meadowcroft et al. |
| 2012/0163754 A1 | 6/2012 | Benjamin et al. |
| 2012/0177327 A1 | 7/2012 | Dermeritt et al. |
| 2012/0194912 A1 | 8/2012 | Faraon et al. |

FOREIGN PATENT DOCUMENTS

| | | |
|---|---|---|
| JP | 2003315624 | 11/2003 |
| JP | 2007102114 A | 4/2007 |
| JP | 2008216602 | 9/2008 |
| JP | 2010-079041 A | 4/2010 |
| JP | 2010-212625 A | 9/2010 |
| KR | 10-0803288 B1 | 2/2008 |
| TW | 201140141 A | 8/2007 |
| TW | 201021220 A | 6/2010 |
| TW | 201239436 A | 10/2012 |
| WO | WO-9952006 A2 | 10/1999 |
| WO | WO-2009043880 A1 | 4/2009 |
| WO | WO-2010110504 A1 | 9/2010 |
| WO | WO-2011037563 A1 | 3/2011 |
| WO | WO-2012144997 | 10/2012 |
| WO | WO-2013126068 | 8/2013 |
| WO | WO-2014018047 | 1/2014 |

OTHER PUBLICATIONS

Chiu, C. H. et al., Broadband and omnidirectional antireflection employing disordered GaN nanopillars, Optics Express, vol. 16. No. 12. May 30, 2008, pp. 8748-8754.

Cui, Yonghao et al., "Electro-Thermally tunable Silicon Photonic Crystal Lens", IEEE 2010, pp. 188-191.

Dickensheets, D. L. et al., Nanostructured effective-index micro-optical devices based on blazed 2-D sub-wavelength gratings with uniform features on a variable-pitch, 2008, pp. 54-55.

International Search Report, Jan. 11, 2012, PCT Patent Application No. PCT/US11/33287 filed Apr. 20, 2011 (3 pages).

Jahns, Jurgen, "Planar Packaging of Free-Space Optical Interconnections", IEEE, vol. 82 No. 11, Nov. 1994, pp. 1623-1631.

Korean Intellectual Property Office, International Search Report and Written Opinion for PCT/US2013/023772 mailed Oct. 24, 2013 (11 pages).

Korean Intellectual Property Office, International Search Report, PCT Application No. PCT/US2011/033295, Jan. 2, 2012 (3 pages).

Padgett, Miles et al., "Light with a twist in its tail," Contemporary Physics, 2000, vol. 41, No. 5, pp. 275-285.

Supplementary European Search Report, Nov. 17, 2014, European Patent Application No. 11863987.1, 3 pages.

Takahashi, Kazuhiro et al., "A two-dimensional f-θ micro optical lens scanner with electrostatic comb-drive XY-stage," IEICE Electronics Express, vol. 2, No. 21, Nov. 10, 2005, pp. 542-547.

The International Bureau of WIPO, International Preliminary Report on Patentability for PCT/US2013/023772 dated Aug. 13, 2015 (8 pages).

www.lightwaveonline.com, Article: US Conec develops PRIZM LightTurn connector—Lightwave dated Mar. 28, 2010 (9 pages).

Zhou, Z. et al., Silicon nanophotonic devices based on resonance enhancement, Journal of Nanophotonics. vol. 4, 041001, Nov. 24, 2010 (24 pages).

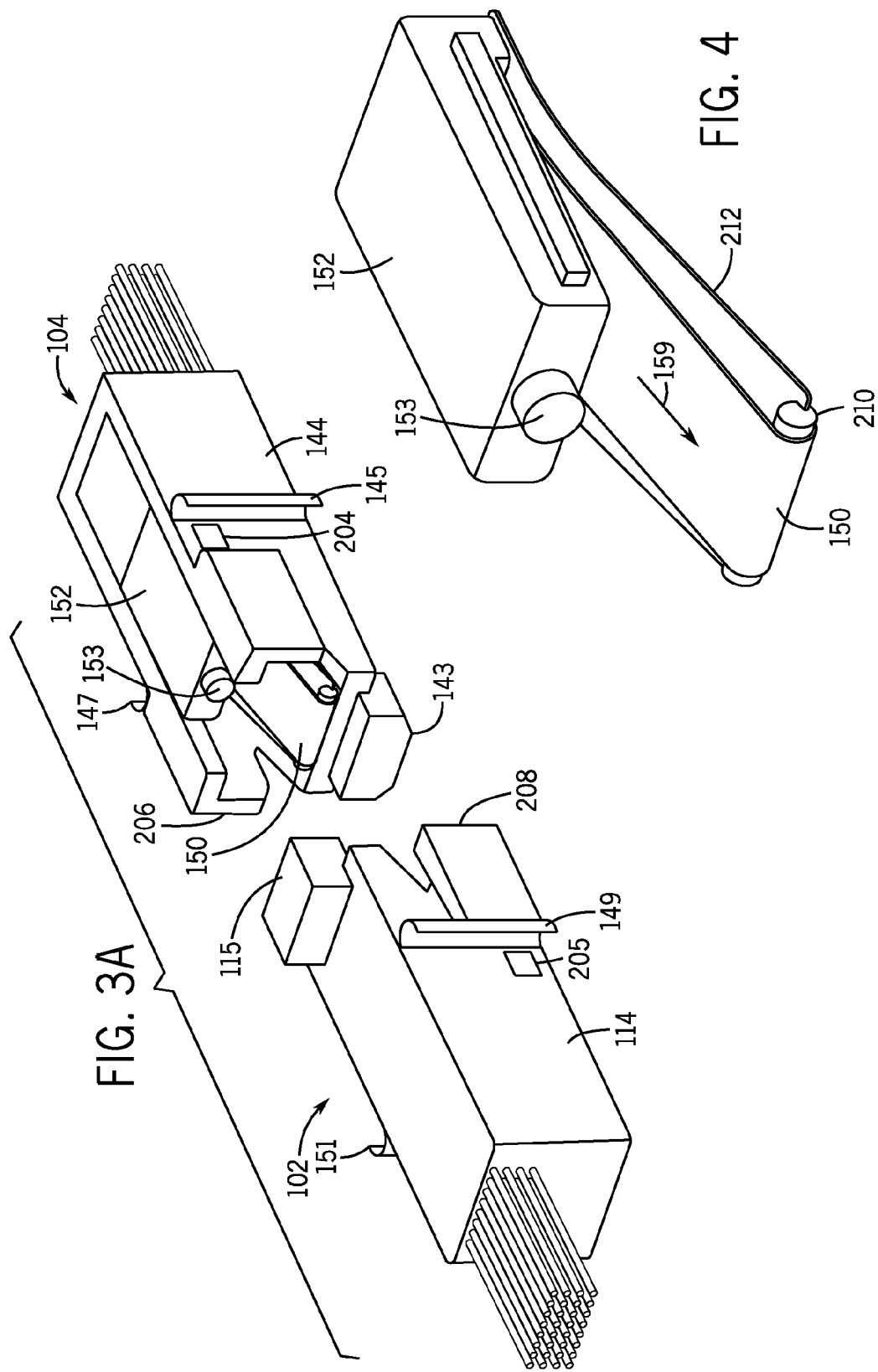

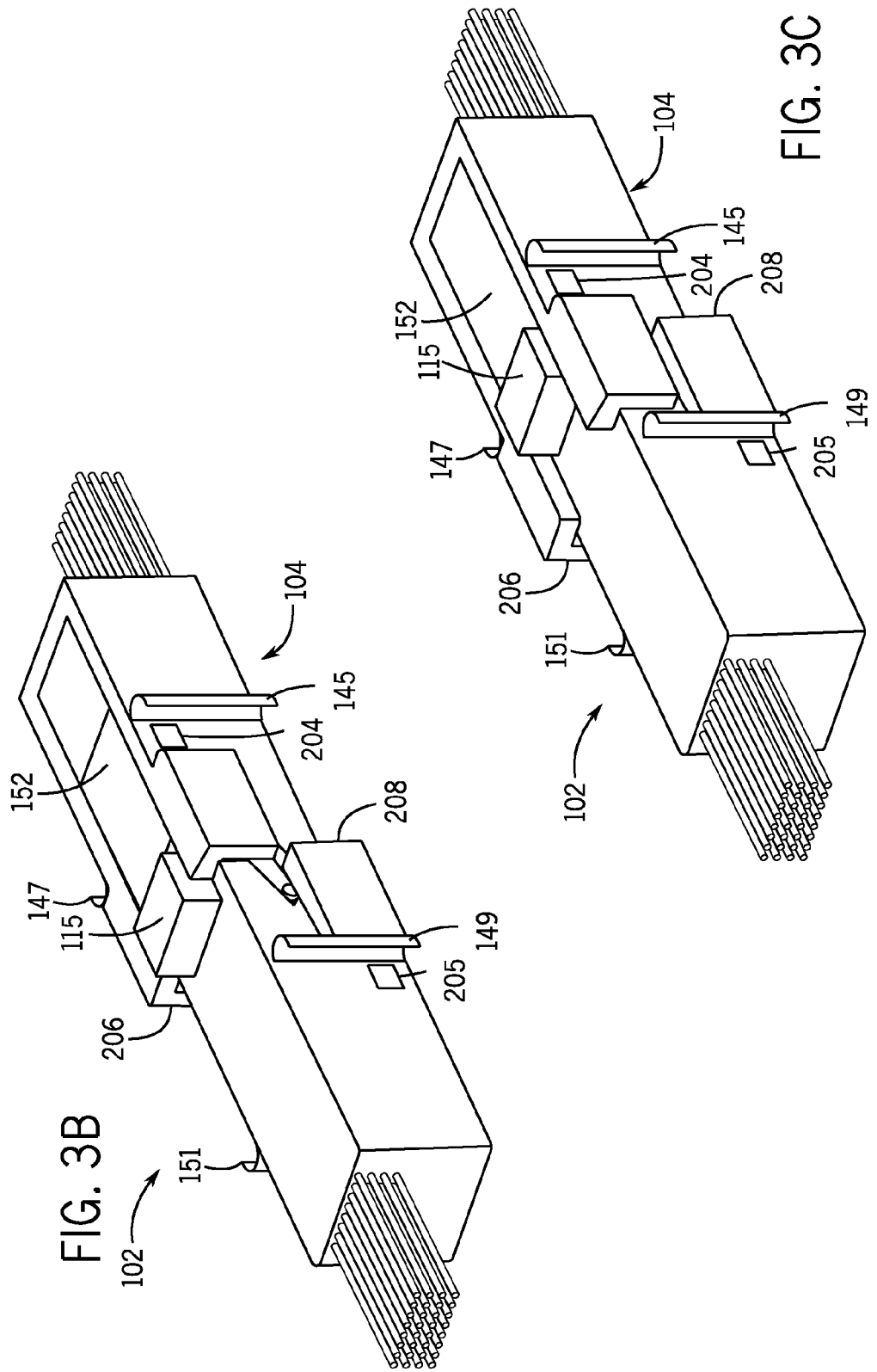

OPTICAL CONNECTOR HAVING A CLEANING ELEMENT

BACKGROUND

Electronic components can be optically connected to each other to allow for communication of optical signals between the electronic components. For example, an electronic device having an optical connector can be connected to a backplane infrastructure that has a mating optical connector. Alternatively, electronic devices having respective optical connectors can be optically connected to each other.

BRIEF DESCRIPTION OF THE DRAWINGS

Some embodiments are described with respect to the following figures:

FIGS. 3A-3C are perspective views of two optical connectors that are to mate with each other, in accordance with some implementations;

FIG. 4 is a perspective view of an assembly that includes a plunger and a cleaning element, in accordance with some implementations;

DETAILED DESCRIPTION

Figure 11:
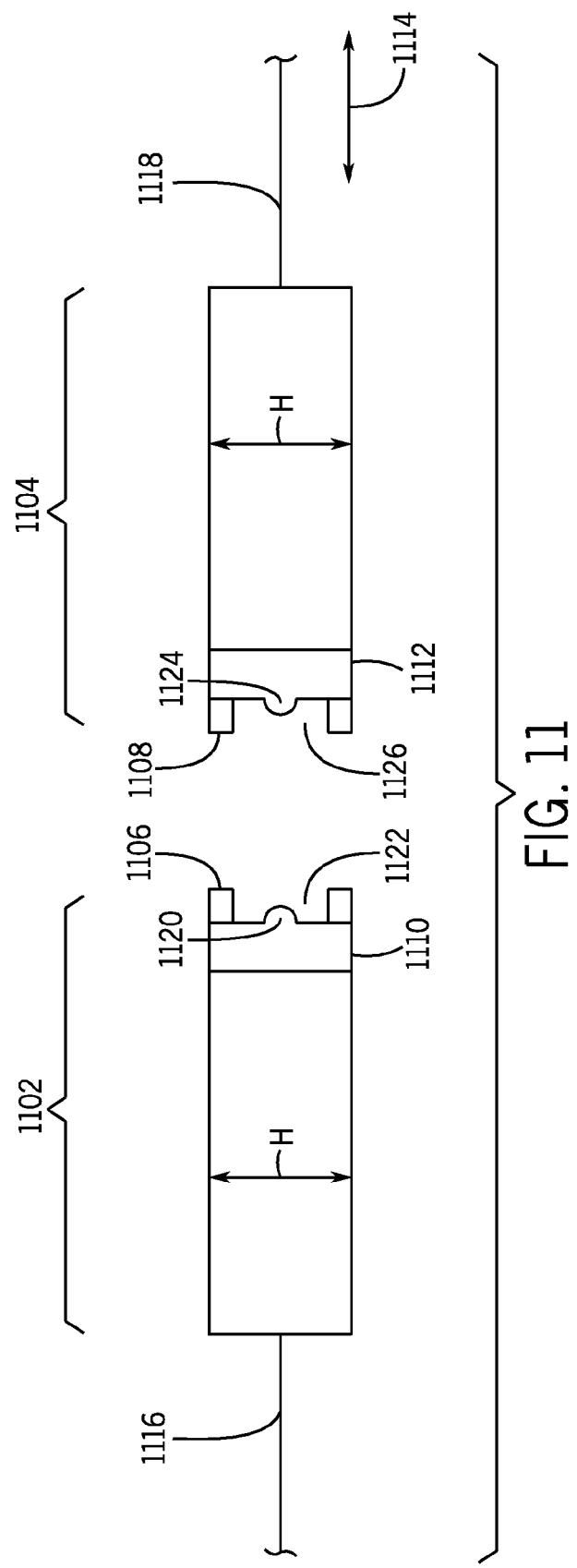
FIG. 11 is a side view of optical connectors according to an example.

An optical connector can include an array of lenses. When the optical connector is mated to a corresponding optical connector, the lens arrays of the mating optical connectors are brought into proximity with each other, such that optical signals can be communicated between the lens arrays. In some optical connectors, such as optical connector 1102 depicted in FIG. 11, an engagement surface 1106 of a lens assembly 1110 (including an array of lens elements) is generally perpendicular to the direction of travel (along axis 1114) of the optical connector 1102 as the optical connector 1102 mates with another optical connector 1104. The optical connector 1104 also includes a lens assembly 1112 having an engagement surface 1108 that is generally perpendicular to the axis 1114. Optical fibers 1116 and 1118 extend from rear parts of the optical connectors 1102 and 1104, respectively. FIG. 11 shows the optical connectors 1102 and 1104 where only one corresponding lens 1120 and 1124 of the respective array of lens elements is visible in the side view.

FIG. 11 also shows a cavity 1122 in the lens assembly 1110, and a cavity 1126 in the lens assembly 1112. The lenses 1120 and 1124 are recessed into the respective cavities or recesses 1122 and 1126. Light can pass across free air between the lenses 1120 and 1124 when the optical connectors 1110 and 1112 are engaged.

In the arrangement depicted in FIG. 11, increasing the number of lens elements in the lens assembly 1110 or 1112 may involve having additional arrays of lens elements and may cause the height H of the optical connector 1110 or 1112 to increase. Increasing the height H of the optical connector can prevent the optical connector from achieving a target thin profile. Optical connectors with small dimensions including thin profiles may be desirable in certain applications, such as in systems where there is a relatively high density of optical connectors.

Optical connectors may also be sensitive to the presence of debris (e.g. dust, dirt, lint, etc.). In some examples, debris can collect in the cavities or recesses 1122 and 1126 of the respective lens assemblies 1110 and 1112. The debris in the cavity or recess may migrate onto lens surfaces and the debris may cause blockage of or interference with communication of light between optical connectors.

In some cases, the lens assemblies of optical connectors may be manually cleaned by humans—however, manual cleaning of optical connector lens assemblies may not be practical in systems with a relatively large number of optical connectors, or with optical connectors that have lens assemblies that are difficult to reach, such as an optical backplane located deep inside an enclosure.

Figure 1:
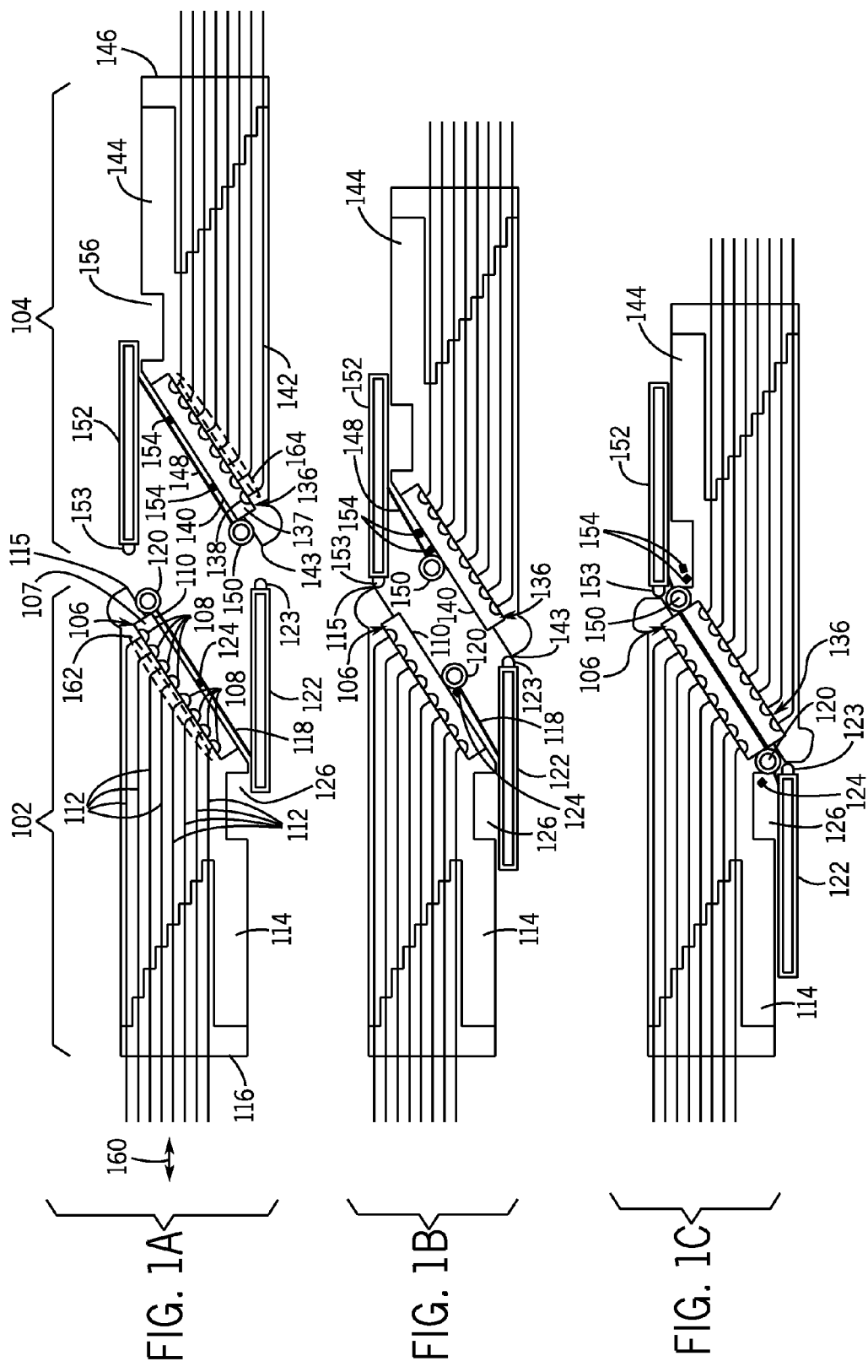
FIGS. 1A-1C are side views of two optical connectors that are to mate with each other, in accordance with some implementations.

In accordance with some implementations, an optical connector is provided that has a relatively thin profile, and which includes a cleaning element to clean a surface of a lens assembly. FIGS. 1A-1C illustrate optical connectors 102 and 104 that are configured to mate with each other. The optical connectors 102 and 104 are able to blind mate with each other, along a mating axis 160. The optical connectors 102 and 104 travel towards each other along the mating axis 160 to achieve mating engagement. Blind mating can refer to an optical connection in which one set of optical devices is aligned with respect to another set of optical devices, by the simple action of inserting an assembly containing the blind-mateable optical device(s) into a second assembly. Precision alignment (in the range of 1 um to 10 um, for example) between the optical devices may be achieved automatically through the use of mating alignment structures, so that human vision in not involved to align the optical devices to make the connection.

The optical connector 102 has a lens assembly 106 that includes an array of lenses 108. In some examples, the lenses 108 are bulk lenses that are arranged in an array (one-dimensional array or two-dimensional array). In other examples, other types of lenses can be used in the lens assembly 106. For example, the lens assembly 106 can include a sub-wavelength grating or other types of lenses. A sub-wavelength grating can be composed of a relatively thin two-dimensional array of edged patterns that extend perpendicularly from a planar surface of a substrate. Further details regarding sub-wavelength gratings can be found in PCT Application No. PCT/US11/33295, Publication No. WO 2012/144997, filed Apr. 20, 2011.

As best seen in FIG. 1B, the lens assembly 106 has a planar surface 110. The planar surface 110 is generally flat, and is at a side of the lens assembly 106 that faces a lens assembly 136 of the optical connector 104 when the optical connectors 102 and 104 are engaged to each other. By employing the planar surface 110, no recess is formed on the side of the lens assembly 106 that faces the lens assembly 136 of the optical connector 104, such that there is no recess that exists to collect debris that may interfere with light passing through the lens assembly 106.

In some implementations, as exemplified in FIG. 1A, the lenses 108 are covered by a cover 107 of the lens assembly 106. The cover 107 can be formed of an optically clear material that allows passage of light communicated through the lenses 108 (either light emitted by the lenses 108 or light received by the lenses 108) without changing the light characteristics of the lenses 108.

In implementations where the lenses 108 are part of a sub-wavelength grating, the lenses 108 are elements of the sub-wavelength grating that are integrally formed with the cover 107.

The planar surface 110 is inclined (at an angle greater than zero degrees and less than 90 degrees) with respect to the mating axis 160. In some examples, as shown in FIGS. 1A-1C, the lens assembly 106 is generally inclined with respect to the mating axis 160, such that the planar surface 110 of the lens assembly 106 is also inclined correspondingly. In other examples, the lens assembly 106 can be shaped such that the lens assembly 106 is generally parallel to the mating axis 160, but the lens assembly 106 can have a slanted planar surface 110 that is inclined with respect to the matching axis 160.

Each lens 108 is optically connected to a corresponding optical fiber 112. The optical fibers 112 are provided through a body 114 of the optical connector 102. The optical fibers 112 extend from a rear part 116 of the optical connector 102, where the optical fibers can extend to another component (not shown). For example, the optical fibers 112 can extend to another optical connector, to an electronic device with optical interface, or to another optical waveguide. The optical fibers 112 can be individual optical fibers, or they can be part of an optical fiber ribbon or other optical fiber cable.

The optical connector 102 further includes a moveable protection lid 118 that is movable between a first position and a second position. At the first position, as depicted in FIG. 1A, the protection lid 118 completely covers the planar surface 110 of the lens assembly 106. In the second position, as depicted in FIG. 1C, the protection lid 118 is moved away from the planar surface 110 such that the protection lid 118 completely uncovers the planar surface 110. FIG. 1B shows an intermediate position of the protection lid 118, where the protection lid 118 partially covers the planar surface 110 of the lens assembly 106.

A first end of the protection lid 118 is attached to a cleaning element 120, while another end of the protection lid 118 is attached to a plunger 122. The plunger 122 is movable with respect to the connector body 114. Movement of the plunger 122 during engagement of the optical connector 102 with the optical connector 104 causes sliding movement of the protection lid 118. Such sliding movement causes the protection lid 118 to slide away from the lens assembly 106, as shown in FIG. 1B. The sliding movement of the protection lid 118 causes the cleaning element 120 to be dragged along the planar surface 110 of the lens assembly 106. The wiping action between the cleaning element 120 and the planar surface 110 causes cleaning of the planar surface 110.

As shown in the example of FIG. 1A, debris 124 is initially present between the planar surface 110 and the protection lid 118. The wiping motion of the cleaning element 120 with respect to the planar surface 110 causes the cleaning element 120 to wipe the debris 124 away from the planar surface 110 towards a debris cavity 126 formed in the connector body 114, as shown in FIG. 1C.

The optical connector 104 is arranged in similar fashion as the optical connector 102, except that the optical connector 104 has an upside-down arrangement as compared to the arrangement of the optical connector 102. The optical connector 104 has a lens assembly 136 having an array of lenses 138. The lens assembly 136 also includes a cover 137 that covers the lenses 138. Optical fibers 142 are connected to the respective lenses 138, and the optical fibers 142 extend through a body 144 of the optical connector 104. The optical fibers 142 exit through a rear part 146 of the optical connector 104.

The optical connector 104 also includes a moveable protection lid 148, which has one end connected to a cleaning element 150 and another end connected to a plunger 152. Mating engagement between the optical connectors 102 and 104 causes sliding movement of the plunger 152, to cause the moveable protection lid 148 to slide away from the lens assembly 136, which allows the cleaning element 150 to wipe the planar surface 140 of the lens assembly 136. In the example of FIGS. 1A-1C, the wiping motion of the cleaning element 150 causes debris 154 on the planar surface 140 to be wiped towards a debris cavity 156 of the connector body 144.

Although shown as being attached to an end of the protection lid 118 or 148, the cleaning element 120 or 150 can alternatively span a portion or the entirety of the underside of the protection lid 118 or 148. Each of the cleaning elements 120 and 150 can be formed of any of various different elements, including a fabric, a brush, a synthetic material, an anti-static material, a layer coated with liquid, and so forth. As further examples, the cleaning element 120 or 150 can be formed of a statically charged material to attract debris; in such examples, another cleaning element can be provided (off of the lens cover 107 or 137) to remove the debris from the cleaning element 120 or 150.

As further depicted in FIGS. 1A-1C, as the optical connectors 102 and 104 are brought into engagement with each other, an engagement portion 123 of the plunger 122 (of the optical connector 102) engages with a leading surface 143 of the connector body 144 (of the optical connector 104). Similarly, an engagement portion 153 of the plunger 152 (of the optical connector 104) is brought into engagement with a leading surface 115 of the connector body 114 (of the optical connector 102). The engagement between the plunger engagement portions 123, 153 and respective connector body leading surfaces 143 and 115 causes the plungers 122 and 152 to be pushed backwardly with respect to the respective connector bodies 114 and 144.

FIG. 1C shows the plungers 122 and 152 pushed to their respective rear-most positions with respect to the respective connector bodies 114 and 144. As further shown in FIG. 1C, the protection lids 118 and 148 have been completely pulled back from the respective lens assemblies 106 and 136, such that the planar surfaces 110 and 140 of the respective lens assemblies 106 and 136 are completely uncovered. In FIG. 1C, the lens assemblies 106 and 136 are brought into alignment with each other once the optical connectors 102 and 104 are fully engaged. Alignment features (not shown) may be present on the lens assemblies 106 and 136, such that the alignment features can interact with each other to bring the lens assemblies 106 and 136 into alignment with each other.

In some implementations, no or reduced air gap is provided between the planar surfaces 110 and 140. In such implementations, the planar surfaces 110 and 140 are in contact with each other, with a relatively small amount of air gap in between. In other implementations, there can be a relatively slight air gap between the planar surfaces 110 and 140 of the respective lens assemblies 106 and 136. Reducing or eliminating the air gap between the planar surfaces 110 and 140 allows for lower loss transmission of optical signals between lenses 108 and 138 of the lens assemblies 106 and 136, respectively. Without an air gap, light can pass through the lens assemblies 106 and 136 with reduced or minimum change in the refraction index of layers through which the light passes. Reducing refraction can result in reduced optical signal loss as optical signals pass through the lens assemblies 106 and 136.

In some implementations, the planar surfaces 110 and 140 of the lens assemblies 106 and 136 can be coated with an anti-reflection layer to reduce reflections at the mating planar surfaces 110 and 140.

Figure 2:
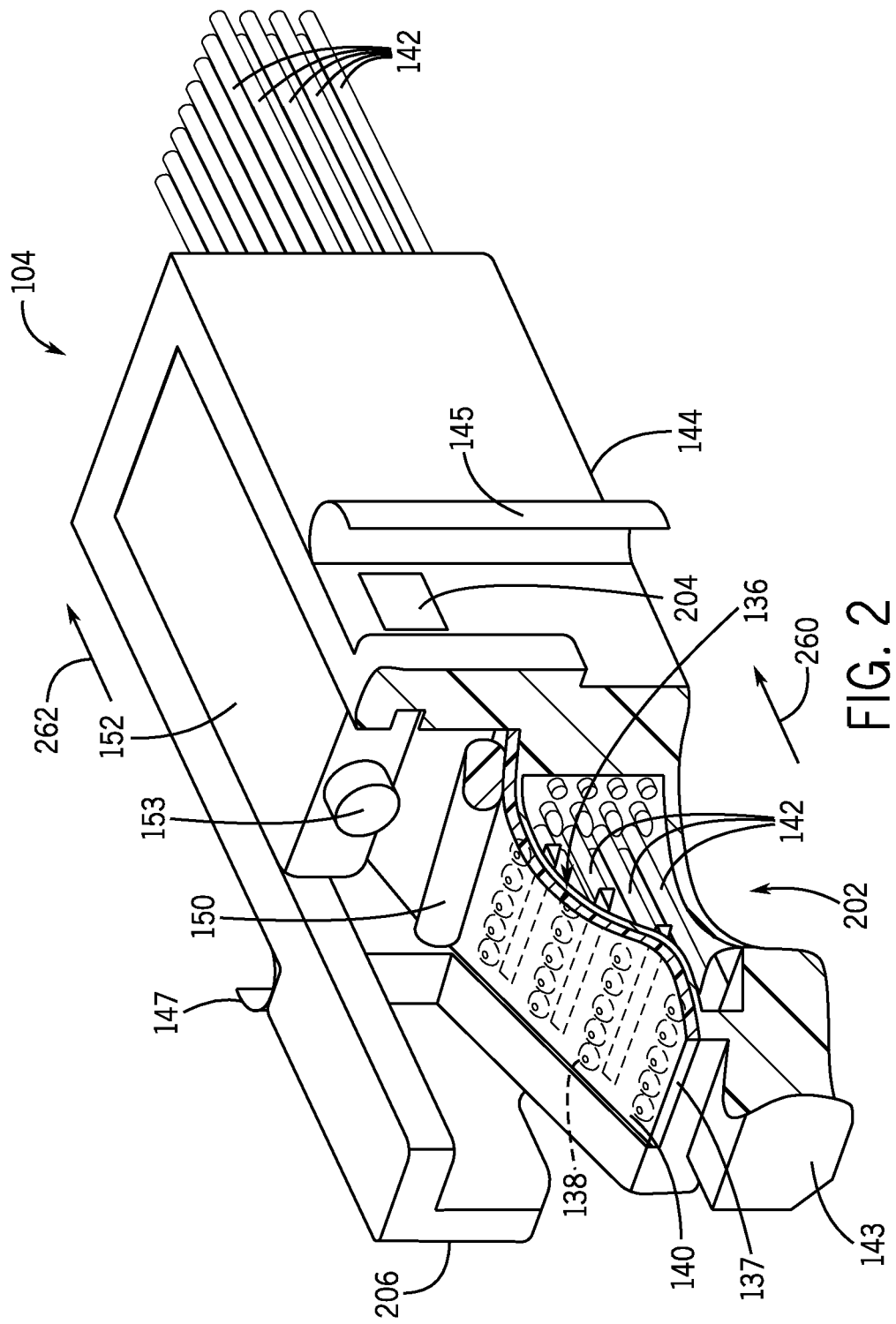
FIG. 2 is a perspective view of an optical connector according to some implementations.

FIG. 2 is a perspective view of the optical connector 104. The plunger 152 shown in FIG. 2 has been pushed backwards to its rear-most position, corresponding to the position depicted in FIG. 1C. Also, the cleaning element 150 has been pushed backwardly to completely uncover the lens assembly 136.

A portion 202 of the optical connector 104 has been cut away to allow inner components of the optical connector 104 to be visible, including optical fibers 142.

As further depicted in FIG. 2, an opening 204 can be provided on the side of the connector body 144. The opening 204 leads to a passageway inside the connector body 144, where the passageway leads to the debris cavity 156 (FIGS. 1A-1C). Debris that has been wiped into the cavity 156 can be removed through the passageway when air flow within the system is directed towards an air flow deflector 145 along the air flow direction 260, and the air flow continues to move through the opening 204 into the passageway. The debris carried by the air flow then exits a corresponding opening on the opposite side of the optical connector 104, and the air flow carrying the debris is guided by another air flow deflector 147 (on the opposite side of the optical connector 104) along the air flow direction 262. In other examples, the air flow directions 260 and 262 may be reversed, while still allowing debris removal by the air flow.

The optical connector 104 further includes an engagement member 206, which is used to engage the optical connector 102. As shown in FIGS. 3A-3C, the optical connector 104 is brought into mating engagement with the optical connector 102. The engagement member 206 of the optical connector 104 engages a respective portion of the optical connector 102, while an engagement number 208 of the optical connector 102 engages a respective portion of the optical connector 104. Also, the plunger engagement portions 123 (see FIGS. 1A-1C) and 153 of the respective optical connectors 102 and 104 are designed to engage with respective leading surfaces 143 and 115, as the optical connectors 102 and 104 are brought into engagement with each other.

FIG. 3B shows partial engagement of the optical connectors 102 and 104. FIG. 3C shows further engagement between the optical connectors 102 and 104, which show that the plunger 152 of the optical connector 104 has been pushed to its rear-most position.

FIG. 3A further shows air flow deflectors 149 and 151 of the optical connector 102, and a corresponding opening 205 (which are similar to the elements 147, 145, and 204, respectively, of the optical connector 104 as shown in FIG. 2).

FIG. 4 depicts an assembly that includes the plunger 152 and the cleaning element 150 of FIG. 2. The cleaning element 150 can include a wiping layer that is arranged on a roller 210. The wiping layer can include a cleaning fabric or any other material that can be used for cleaning a surface. The cleaning assembly that includes the wiping layer 150 allows for renewal of the wiping layer 150 after each use, by incrementally advancing the wiping layer 150 with each use. The roller 210 is pivotably mounted on a support structure 212. During use, such as in response to pushing of the plunger 152 backwardly towards the rear-most position of the optical connector 104, the plunger engagement portion 153 is depressed into the plunger 152, causing an actuation mechanism (not shown) within the plunger 152 to be activated to incrementally advance the wiping layer 150 along the direction 159 such that a new portion of the wiping layer 150 is provided on the roller 210. This allows a fresh portion of the wiping layer 150 to be used for cleaning of the lens assembly.

Figure 5A:
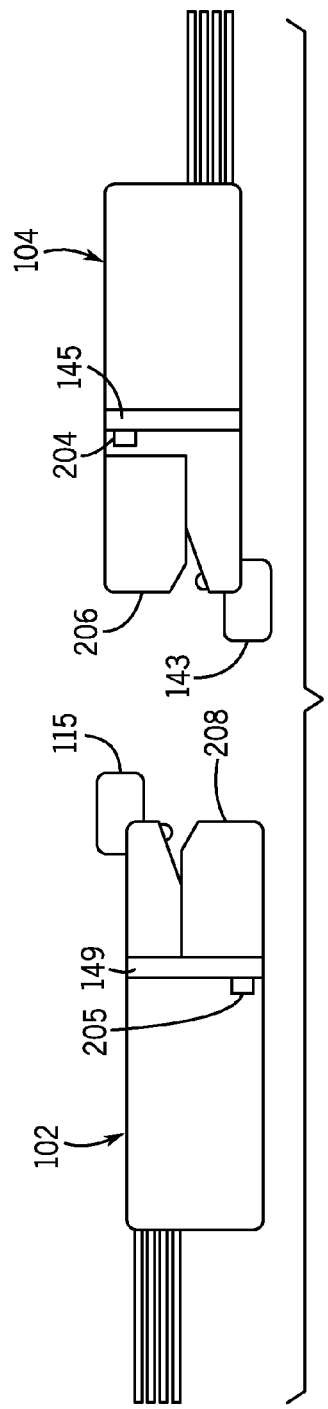
FIGS. 5A-5C are side views illustrating mating engagement of the optical connectors of FIGS. 3A-3C, in accordance with some implementations.
Figure 5B:
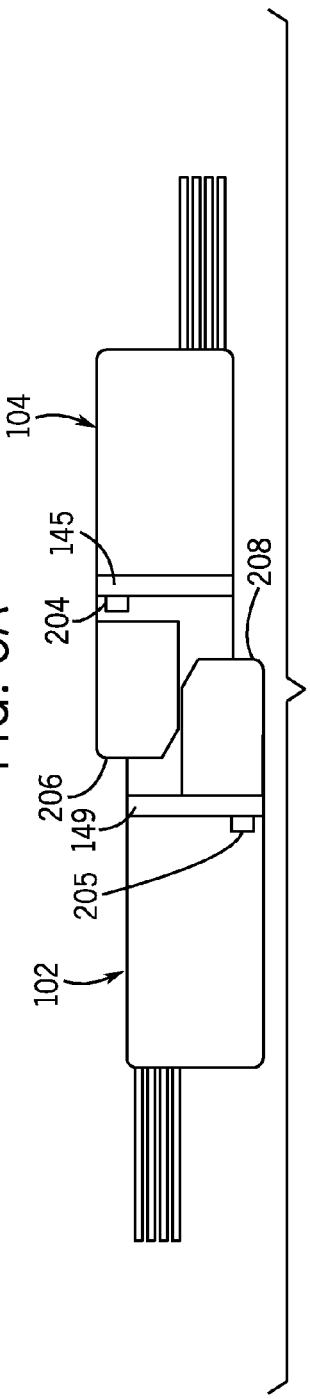
Figure 5C:
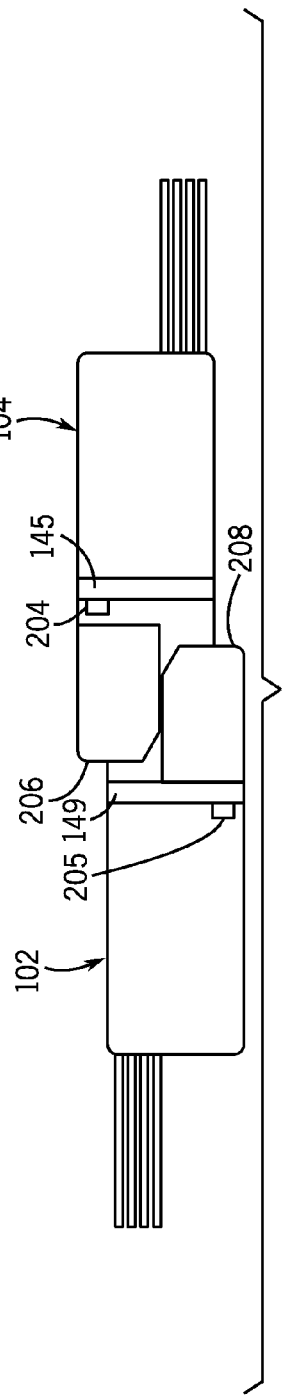

FIG. 5A-5C depict side views of respective engagement positions between the optical connectors 102 and 104. FIG. 5A shows the optical connectors 102 and 104 before engagement, FIG. 5B shows partial engagement between the optical connectors 102 and 104, and FIG. 5C shows full engagement between the optical connectors 102 and 104.

Figures 6A, 6B:
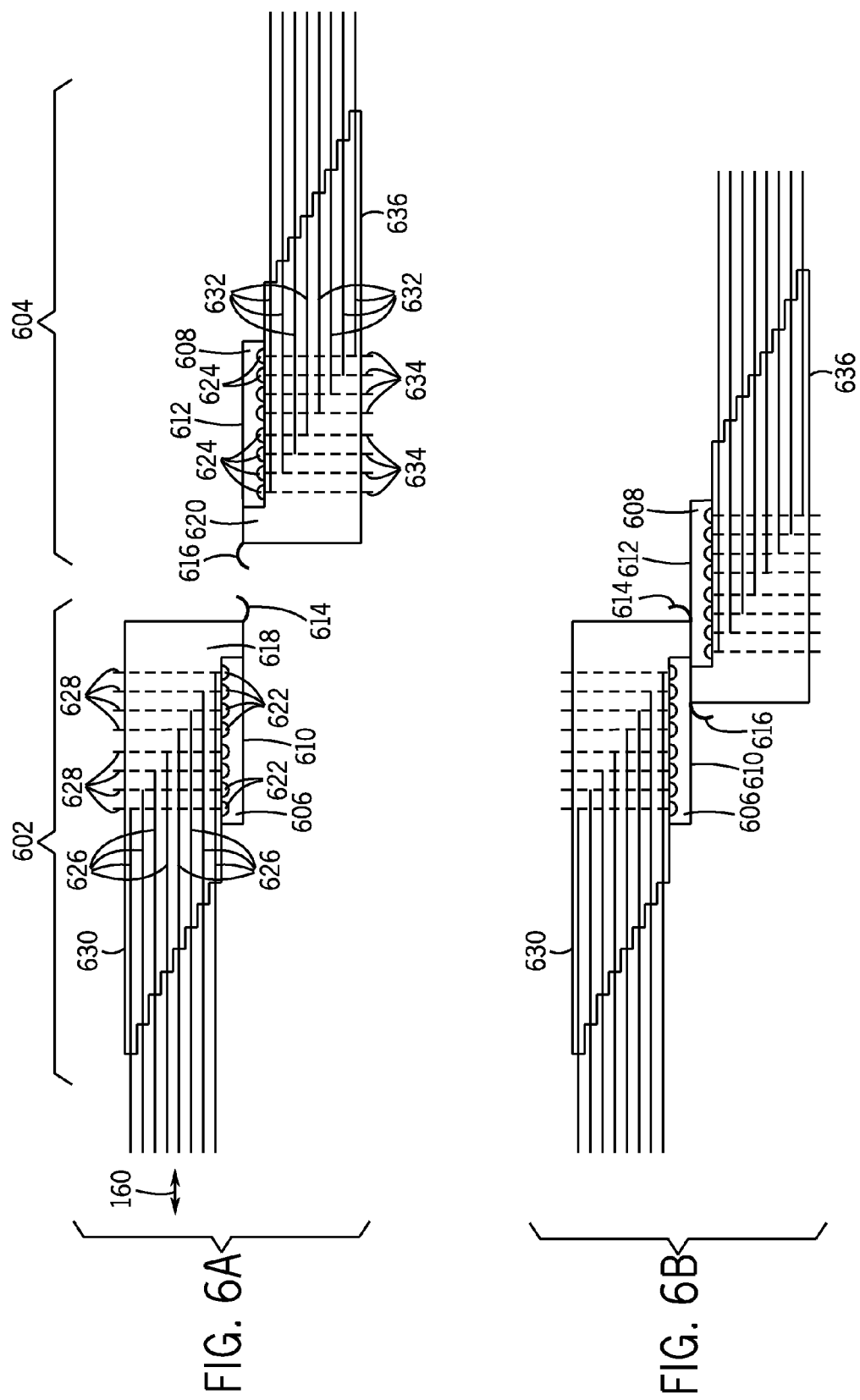
FIGS. 6A-6C are side views of two optical connectors that are to mate with each other, according to alternative implementations.
Figure 6C:
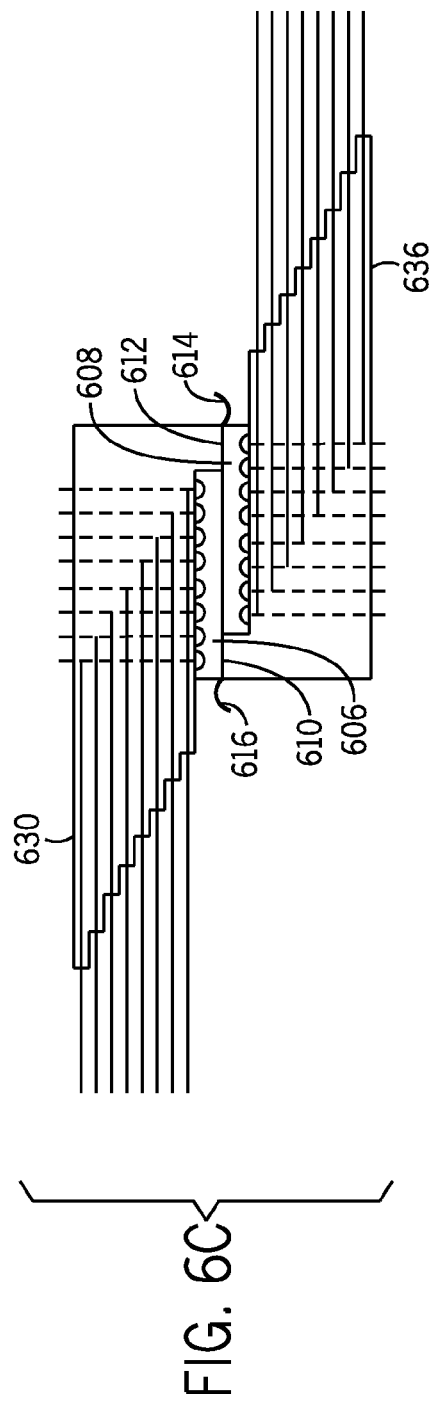

FIGS. 6A-6C illustrate optical connectors 602 and 604 according to alternative implementations. In the optical connectors 102 and 104 of FIGS. 1A-1C, the respective lens assemblies 106 and 136 are inclined such that the planar surfaces 110 and 140, respectively, are also inclined with respect to the mating axis 160 shown in FIG. 1A. In contrast, each of the optical connectors 602 and 604 include respective lens assemblies 606 and 608 having respective planar surfaces 610 and 612, where the planar surfaces 610 and 612 are generally parallel to the mating axis 160 along which the optical connectors 602 and 604 travel to mate with each other. The lens assemblies 606 and 608 are also generally parallel to the mating axis 160. The planar surfaces 610 and 612 are formed on respective sides of the lens assemblies 606 and 608 that face each other such that those sides of the lens assemblies 606 and 608 are formed without any recesses.

A cleaning element 614 is attached to a leading portion 618 of the optical connector 602, while a cleaning element 616 is similarly attached to a leading portion 620 of the optical connector 604. The leading portions 618 and 620 of the optical connectors 602 and 604, respectively, are brought into mating engagement with each other. As the optical connectors 602 and 604 are mated to each other, the cleaning element 614 of the optical connector 602 wipes the planar surface 612 of the lens assembly 608 of the optical connector 604. Similarly, the cleaning element 616 of the optical connector 604 wipes the planar surface 610 of the lens assembly 606 of the optical connector 602. Thus, each cleaning element 614 or 616 is used to clean the lens assembly of the opposing optical connector. This is in contrast to the cleaning element 120 or 150 depicted in FIGS. 1A-1C, which is used to clean the lens assembly of the optical connector that includes the cleaning element. In other words, as shown in FIGS. 1A-1C, the cleaning element 120 of the optical connector 102 is used to clean the lens assembly 106 of the optical connector 102, while the cleaning element 150 of the optical connector 104 is used to clean the lens assembly 136 of the optical connector 104.

The lens assembly 606 includes an array of lenses 622, which are connected to respective optical fibers 626. Light from the lenses 622 is directed along paths indicated by the dashed lines 628. Although not shown, an optical deflector can be provided along each of the light paths 628 to redirect the direction of the light into the respective optical fiber 626. The optical deflectors can include mirrors or other similar mechanisms for redirecting light to a different direction.

The optical fibers 626 extend through a body 630 of the optical connector 602.

The lens assembly 608 similarly includes an array of lenses 624, which are optically coupled to respective optical fibers 632. Light from the lenses 624 extend along paths represented by dashed lines 634. Although not shown, optical deflectors can be provided along the paths 634 to redirect light into the optical fibers 632. The optical fibers 632 extend through a body 636 of the optical connector 604.

FIG. 6B shows partial engagement between the optical connectors 602 and 604. The cleaning element 616 of the optical connector 604 wipes the planar surface 610 of the lens assembly 606 of the optical connector 602. Similarly, the cleaning element 614 of the optical connector 602 wipes the planar surface 612 of the lens assembly 608 of the optical connector 604. FIG. 6C shows full engagement between the optical connectors 602 and 604, where the respective cleaning elements 614 and 616 have wiped along the entirety of the corresponding planar surfaces 612 and 610, pushing off the debris off the planar surfaces 612 and 610.

As depicted in FIG. 6C, the planar surfaces 610 and 612 of the respective lens assemblies 606 and 608 are in contact with each other, which reduces or eliminates any air gap between the planar surfaces 610 and 612. In other examples, FIGS. 6A-6C may include a protection lid for each optical connector 602 and 604, where a tab on a protection lid of an optical connector can be pushed by a leading portion of the mating optical connector when the two optical connectors are engaged, similar to operations discussed above.

Figure 12A:
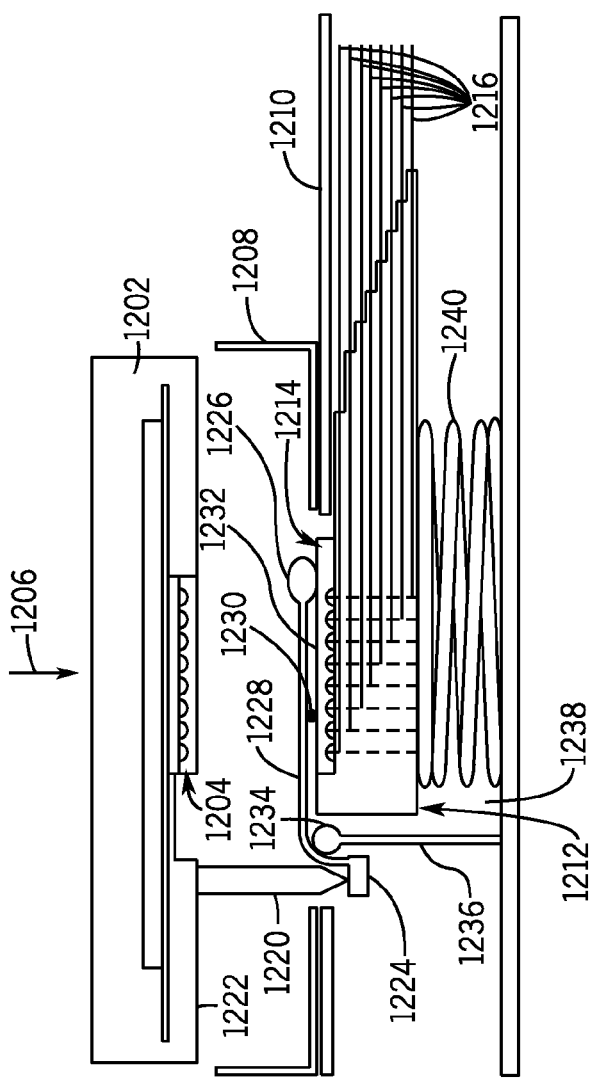
FIGS. 12A-12B are side views of an arrangement that includes an integrated circuit chip, a socket, and an optical connector, according to alternative implementations.
Figure 12B:
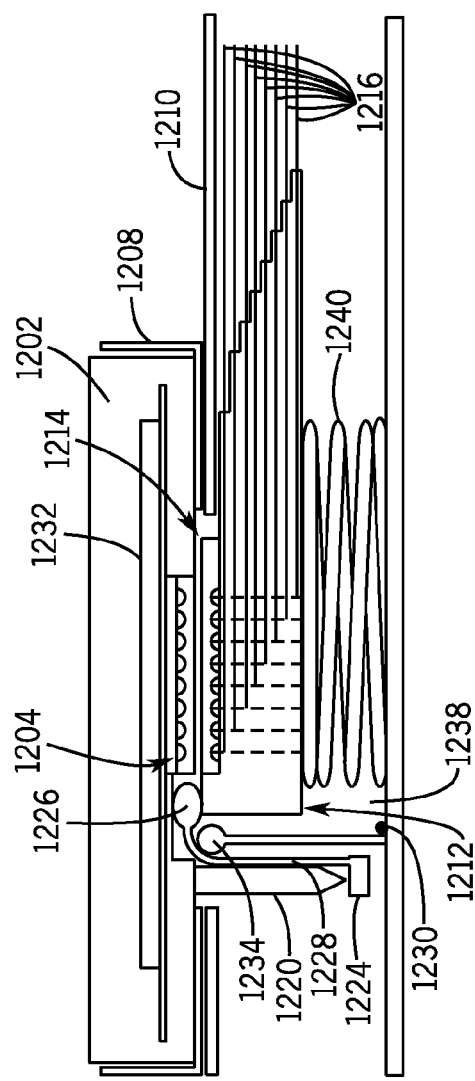

Although the present discussion depicts an optical connector being mated with another optical connector both terminated with optical fibers, it is noted that in alternative implementations, an optical connector terminated with optical fibers can be mated with a socket that is arranged on a circuit board or other support structure. A cleaning element may be provided with one or both of the optical connectors. FIGS. 12A and 12B show an example of an integrated circuit (IC) chip 1202 (e.g. electronics card, electronics device, etc.) having an optical connector with a lens assembly 1204 inserted (along direction 1206 in FIG. 12A) into a socket 1208 arranged on a circuit board 1210 or other support structure. An optical connector 1212 is provided under the socket 1208. In other examples, the optical connector 1212 is associated with the socket 1208, but is arranged to have a different relative position with respect to the socket 1208. The lens assembly 1204 of the IC chip 1202 is configured to mate with a lens assembly 1214 of the optical connector 1212. The lens assembly 1214 has lenses that are optically coupled to optical fibers 1216 that extend through a body of the optical connector 1212.

An actuation post 1220 depends from a lower surface 1222 of the IC chip 1202. The actuation post 1220 is to engage an actuation element 1224 of a cleaning assembly that also includes a cleaning element 1226 (similar to those discussed above). The cleaning element 1226 is attached to a protection lid 1228, which in turn is attached to the actuation element 1224.

The protection lid 1228 is engaged on a roller 1234 (or other type of engagement structure) that is supported by a support wall 1236. The example of FIGS. 12A and 12B also depict a spring 1240 on which the optical connector 1212 is supported. In other examples, the optical connector 1212 can be supported on a different structure.

Although FIGS. 12A-12B show the protection lid 1228 moved to one side of the socket 1208, it is noted that there can be more than one protection lid for the socket 1208. As further examples, the underside of the protection lid 1228 can be coated or covered with a static material to attract debris. The roller (or other structure) 1234 can scrub the underside of the protection lid 1228 to scrub away debris as the protection lid 1228 slides across the roller 1234 (or other structure). For example, a brush, statically charged material, or other component can be used to scrub the debris on the underside of the protection lid 1228.

As the IC chip 1202 moves downwardly (along direction 1206) into the socket 1208, the actuation post 1220 of the IC chip 1202 engages the actuation element 1224 of the cleaning assembly. The downward motion of the actuation post 1220 causes the actuation element 1224 to be moved downwardly, as depicted in FIG. 12B. The downward movement of the actuation element 1224 causes the cleaning element 1226 to be dragged along a planar surface 1232 of the lens assembly 1214, which provides a wiping motion of the cleaning element 1226 with respect to the planar surface 1232. This wiping motion causes the cleaning element 1226 to wipe debris 1230 away from the planar surface 1232 towards a cavity 1238, as shown in FIG. 12B. In other examples, the actuating post 1220 and the actuating element 1224 may have different structures, shapes, sizes and movement directions to effectively move the protection lid 1228 along the planar surface 1232.

In some examples, the optical fibers of the mating optical connectors (e.g. 102 and 104 in FIGS. 1A-1C or 602 and 604 in FIGS. 6A-6C), respectively, can be of the same type. Alternatively, a given optical fiber of a first optical connector can be of a type that is different from the corresponding given optical fiber of a second optical connector. The given optical fiber is in optical communication with the given optical fiber, through a respective pair of lenses in the respective optical connectors.

For example, a first type of an optical fiber can be a single-mode fiber, whereas a second type of an optical fiber can be a multi-mode fiber. A single-mode optical fiber is used to carry optical signals produced by a single-mode signal source. On the other hand, a multi-mode optical fiber is used to carry optical signals produced by a multi-mode signal source. A multi-mode optical fiber can have a larger core diameter than a single-mode optical fiber. In implementations where a given optical fiber of the first optical connector is of a type that is different from the corresponding optical fiber of the second optical connector, a mode matching mechanism can be provided to couple optical signals between the different types of optical fibers (e.g. between a single-mode optical fiber and a multi-mode optical fiber).

In other examples, the optical lenses in the lens assembly 1204 of the IC chip 1202 in FIGS. 12A-12B can be of the single-mode or multi-mode type, whereas the optical lenses of the lens assembly 1214 in FIGS. 12A-12B can be of the multi-mode type. When the optical signals generated within the IC chip 1202 are multi-mode signals, the optical lenses in the lens assembly 1204 are correspondingly of the multi-mode type, matching with the optical lenses of the lens assembly 1214 of the multi-mode type on the optical connector 1212. On the other hand, when the optical signals generated within the IC chip 1202 are single-mode signals, the optical lenses in the lens assembly 1204 are correspondingly of the single-mode type, but matched (by a mode matching mechanism) with the optical lenses in the lens assembly 1214 of the multi-mode type on the optical connector 1212.

Examples of mode matching mechanisms are described in U.S. application Ser. No. 13/562,487, filed on Jul. 31, 2012.

By using the inclined lens assemblies 106 and 136 as depicted in FIGS. 1A-1C, it is possible to allow the respective optical fibers 112 and 142 to change directions by gradually curving portions of the respective optical fibers 112 and 142. The curving of the optical fibers 112 occurs generally at portions 162, while the curving of the optical fibers 142 occurs generally at portions 164. By allowing for the gradual curving of the optical fibers 112 and 142, optical deflectors including mirrors or prisms would not have to be employed to cause a change of direction of optical signals carried by the respective optical fibers 112 and 142.

More specifically, an optical fiber 112 connected to a respective lens 108 in the lens assembly 106 extends from the lens 108 into the connector body 114. The optical fiber 112 is then curved at portion 162, to cause the optical fiber 112 to change direction to run along a direction parallel to the axis 160 along the length of the optical connector 102. In this way, an optical signal that is received by the lens 108 can travel along the curved portion 162 of the optical fiber 112 and be redirected to travel along a direction parallel to the axis 160.

Similarly, an optical fiber 142 connected to the respective lens 138 in the lens assembly 136 extends from the lens 138 into the connector body 144. The optical fiber 142 is then curved at portion 164, to cause the optical fiber 142 to change direction to run along a direction parallel to the axis 160.

By using inclined lens assemblies and optical fibers with curved portions, an optical connector in which light has to make a right-angle turn can be avoided. Note that optical connectors 602 and 604 in FIGS. 6A-6C are examples of optical connectors in which optical deflectors are provided to cause light to make right-angle turns.

Figure 7:
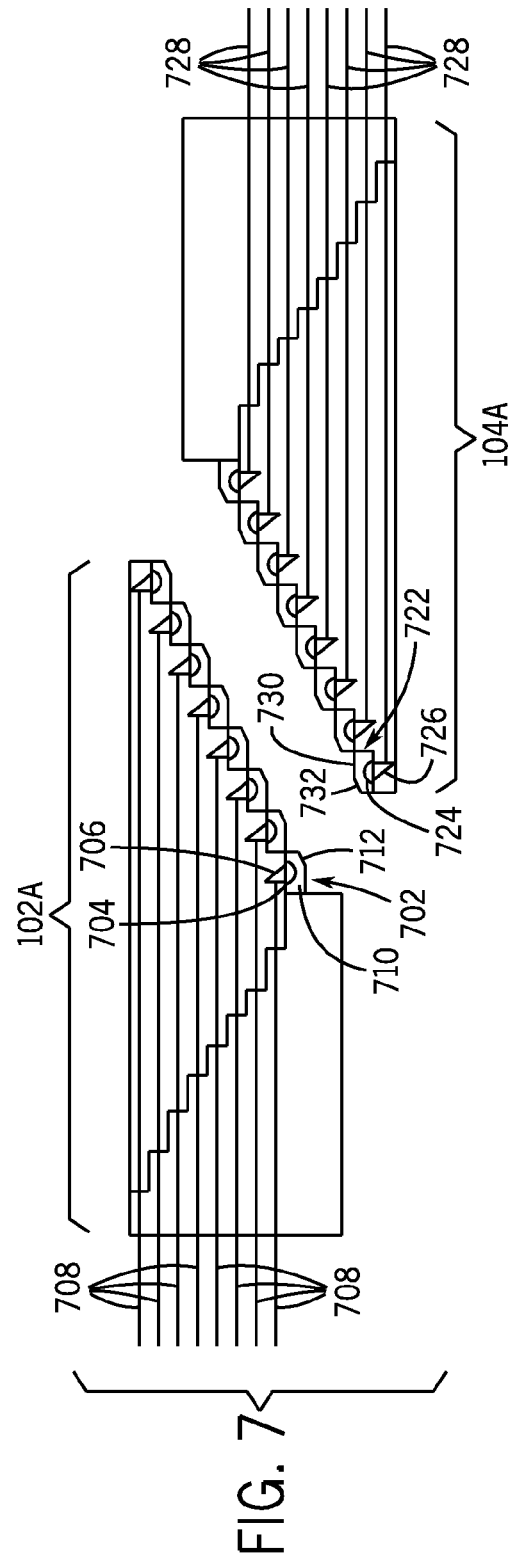
FIG. 7 is a side view of two optical connectors that are to mate with each other, according to further implementations.

In alternative implementations, an optical connector can include multiple lens assemblies, which may be associated with the respective cleaning elements. FIGS. 1A-1C and 6A-6C depict lens assemblies each having a cover for multiple lenses. As shown in FIG. 7, according to alternative implementations, an optical connector 102A includes a number of individual lens assemblies 702 each having a respective lens 704. Each lens assembly 702 has a lens cover 710 (formed of an optically clear material) that covers the respective lens 704. The lens cover 710 has an inclined planar surface 712. The lens 704 is optically connected to light deflector 706, which redirects light from the lens 702 towards a respective optical fiber 708. Similarly, light traveling from the optical fibers 708 can be redirected by the light deflectors 706 towards the respective lenses 704.

The optical connector 104A has a similar arrangement of lens assemblies 722. Each lens assembly 722 includes a lens 724 and a cover 730 to cover the lens 724. The lens cover 730 has an inclined planar surface 732 that is to come into engagement with the inclined surface 712 of the respective lens assembly 706 when the optical connectors 102A and 104A are brought into mating engagement.

The optical connector 104A further includes light deflectors 726 for the respective lenses 724. Each light deflector 726 is to cause re-direction of light between the lens 724 and the respective optical fiber 728. Although not shown, cleaning elements similar to those discussed above can also be associated with the lens assemblies 702 and 722, to cause cleaning of respective inclined planar surfaces 712 and 732, when the connectors 102A and 104A travel along an axis perpendicular to the page containing FIG. 7. A cleaning element for the arrangement of FIG. 7 travels along the axis that is perpendicular to the page containing FIG. 7 to wipe the respective inclined planar surface 712 or 732. One cleaning element is provided for each lens cover 710 or 730.

Figure 8:
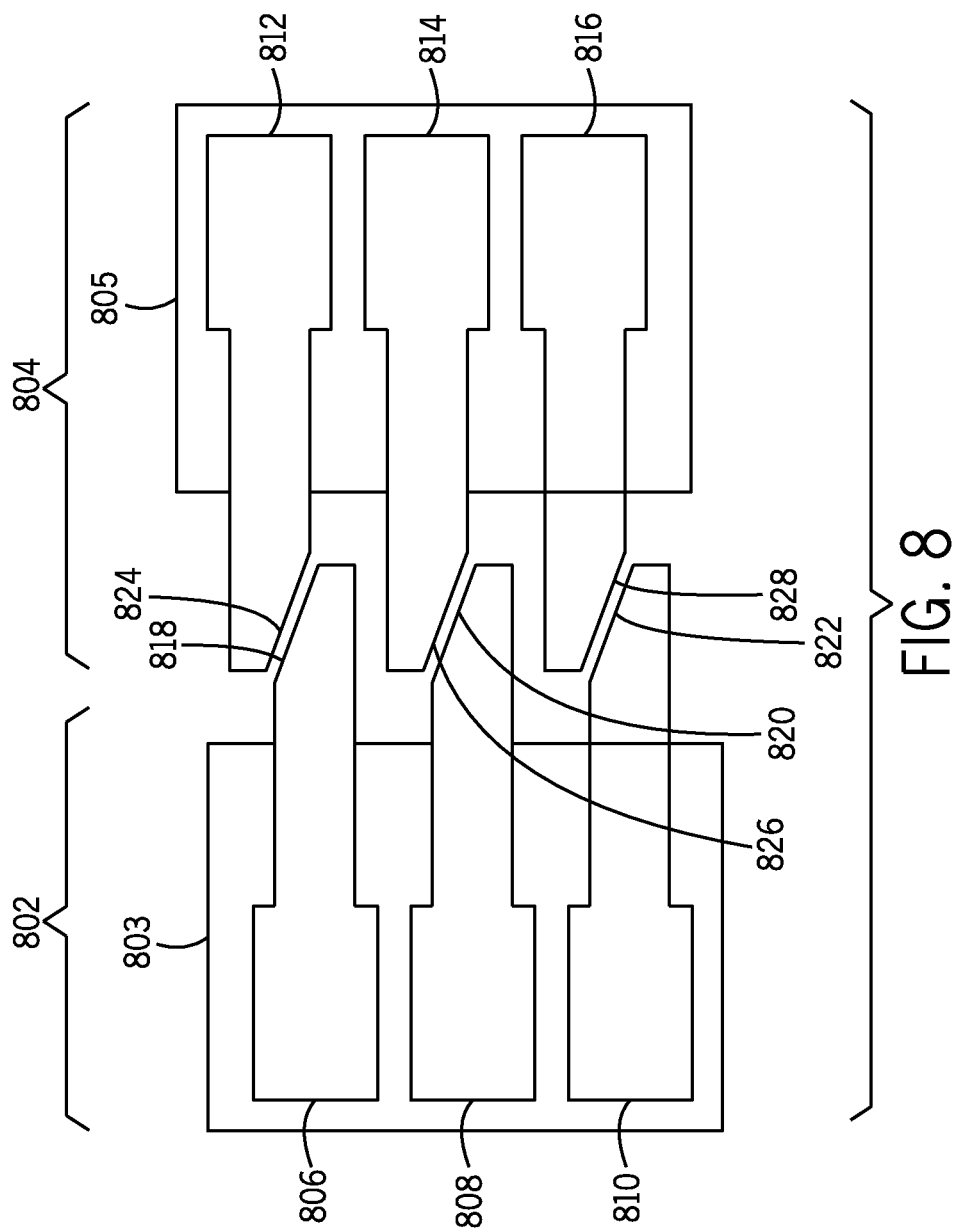
FIG. 8 is a side view of optical connector modules according to other implementations.

FIG. 8 shows optical connector modules 802 and 804 that each includes multiple optical connectors. For example, the optical connector module 802 includes three optical connectors 806, 808, and 810. Similarly, the optical connector module 804 includes multiple optical connectors 812, 814, and 816. The optical connectors 806, 808, and 810 are provided within a housing 803 of the optical connector module 802, while the optical connectors 812, 814, and 816 are provided within a housing 805 of the optical connector module 804.

The optical connectors 806-810 have respective inclined lens planar surfaces 818, 820, and 822, while the optical connectors 812, 814, and 816 have respective inclined lens planar surfaces 824, 826, and 828.

Although not shown in FIG. 8, each of the optical connectors 806-810, and 812-816 can include respective cleaning elements (similar to those discussed above) to clean corresponding inclined lens planar surfaces.

Figure 9:
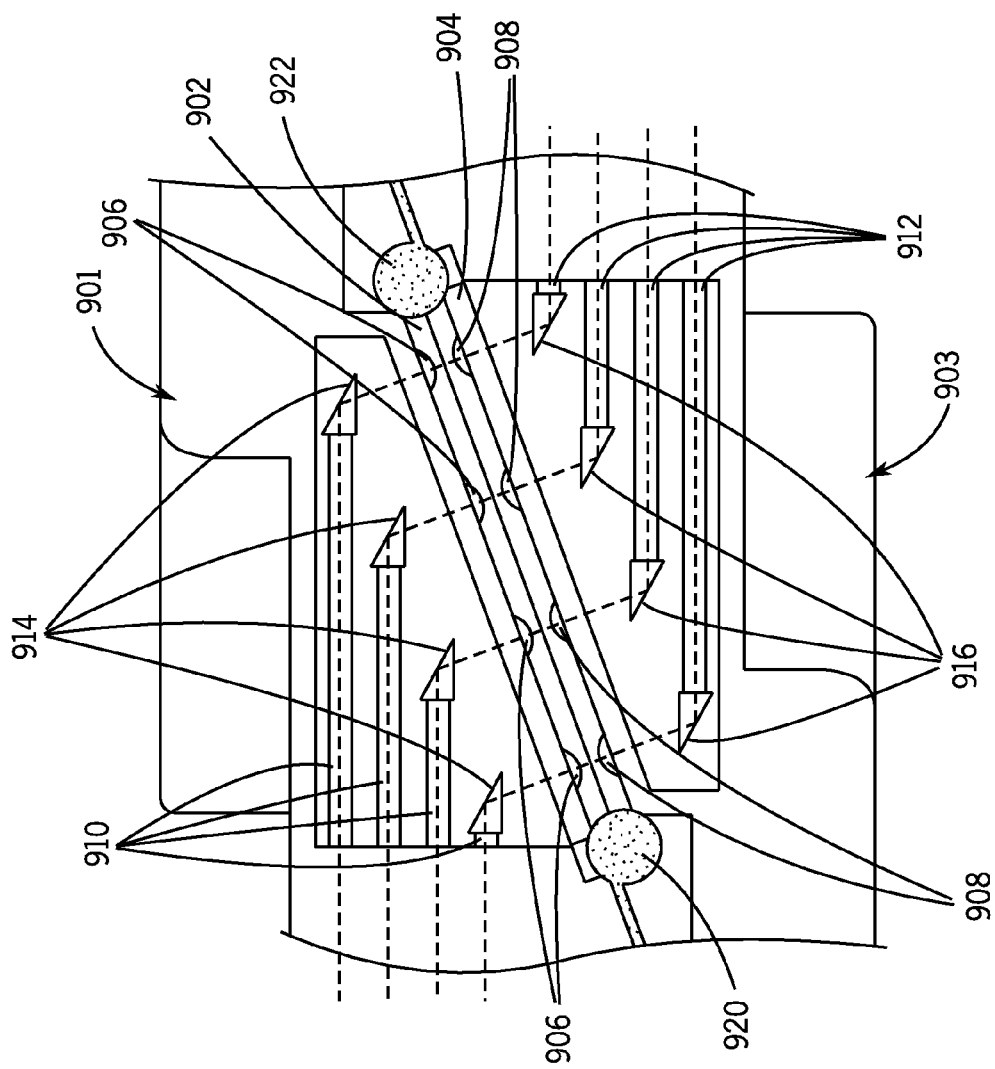
FIG. 9 is a side view of portions of optical connectors according to yet further implementations.

FIG. 9 shows an alternative arrangement of lens assemblies. A first lens assembly 902 is part of the first optical connector 901, whereas a second lens assembly 904 is part of the second optical connector 903. The lens assemblies 902 and 904 are brought into mating engagement with each other, where the planar surfaces of the respective lens assemblies 902 and 904 are in contact with each other. The lens assembly 902 has lenses 906, whereas the lens assembly 904 includes lenses 908.

Dashed lines in FIG. 9 illustrate optical paths that traverse through respective pairs of lenses 906 and 908, as well as respective optical fibers 910 of the optical connector 901, and optical fibers 912 of the optical connector 903. In addition, light deflectors 914 are provided in the optical connector 901, and light deflectors 916 are provided in the optical connector 903. Each light deflector 914 is to cause redirection of light between an optical fiber 910 and the corresponding lens 906, at greater than 90° so that the planar surfaces can be inclined. Similarly, each light deflector 916 is to cause light deflection between an optical fiber 912 and the corresponding lens 908 at greater than 90°.

The optical connector 901 also includes a cleaning element 920, for cleaning the planar surface of the lens assembly 902. Similarly, the optical connector 903 includes a cleaning element 922 for cleaning the planar surface of the lens assembly 904. The operation of the cleaning elements 920 and 922 is similar to the respective cleaning elements discussed in connection with FIGS. 1A-1C.

By using optical connectors according to various implementations, relatively thin profile optical connectors can be achieved, while providing the ability to clean lens surfaces of lens assemblies in the optical connectors. Also, by arranging a lens assembly in a horizontal or inclined fashion, scaling to accommodate increasing numbers of lenses and optical fibers can be made more easily without substantially increasing the profile of an optical connector. Also, arrangements of the optical connectors according to some implementations reduce or eliminate air gaps between the lens assemblies, which reduces refraction that can cause optical signal loss. The planar lens surfaces can be coated with an anti-static, anti-scratch, and anti-reflective material for reducing reflection loss to make it less likely for debris to adhere to the lens surfaces. The amount of parts in the optical connectors can be reduced using designs according to some implementations.

Figure 10:
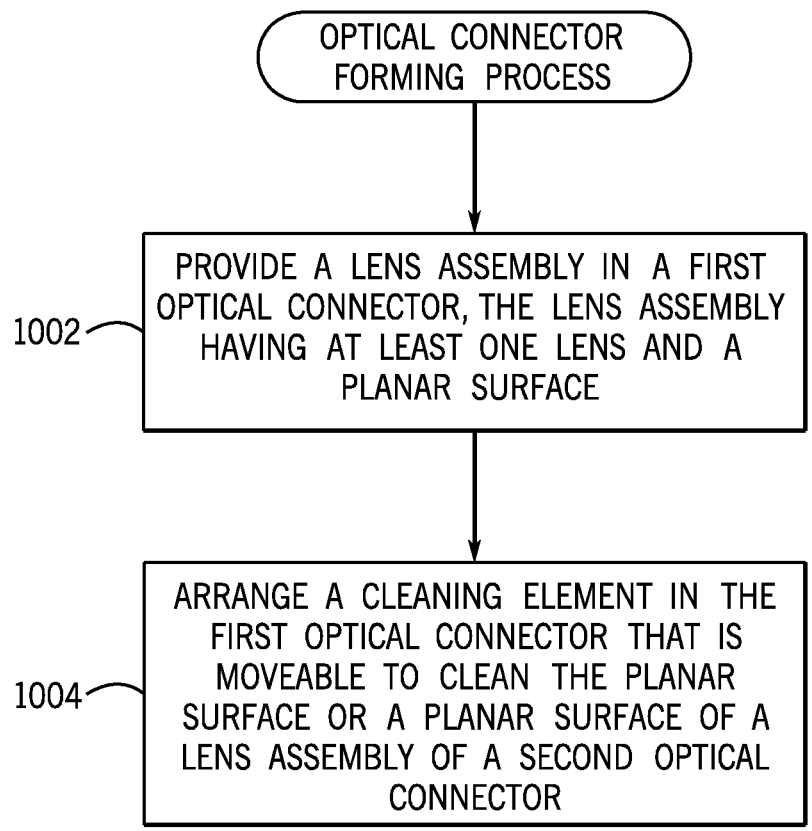
FIG. 10 is a flow diagram of a process of forming an optical connector according to some implementations.

FIG. 10 is a flow diagram of a process of forming an optical connector (any of the optical connectors discussed above in connection with FIGS. 1-9 and 12A-12B). According to some implementations. The process provides (at 1002) a lens assembly in a first optical connector, where the lens assembly includes at least one lens and a planar surface. The process further arranges (at 1004) a cleaning element in the first optical connector that is moveable to clean the planar surface or a planar surface of a lens assembly of a second optical connector.

Although reference is made in the discussions above to optical fibers, it is noted that in alternative examples, other types of optical communication media can be used, such as polymer waveguides and so forth. Furthermore, although not shown, optical and mechanical alignment features can be provided in the various optical connectors. Also, although not shown, mounting features can be provided to fix-mount or float-mount optical connectors on a circuit board, a bulkhead panel, a cable housing, or any other structure.

Also, in various implementations, an optical connector may have only a protection lid, only a cleaning element with moving mechanism attached, or a protection lid attached with a cleaning element. In some further examples, a protection lid of an optical connector may be of a transparent material. In other examples, the protection lid of an optical connector and/or the whole or part of an optical connector body may be color coded to signify the cleaning element features or lens features such as single-mode, multi-mode, collimating lens, imaging lens, anti-reflection coated, certain wavelength optimized, and so forth. In some implementations, the optical connectors depicted in FIGS. 1A-1B, 2, 3A-3C, 5A-5C, 6A-6C, 7, 8 and 9 can have a hermaphroditic design; in other words, the optical connectors have symmetrical blind-mating features with respect to each other where the same connector mold can be used to manufacture each of the mating optical connectors.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. An optical connector apparatus comprising:
   a first optical connector comprising:
      a lens assembly including at least one lens and a planar surface;
      a protection lid attached to the lens assembly, wherein the protection lid is moveable by an actuator between a first position and a second position, the protection lid in the first position covering the planar surface of the lens assembly of the first optical connector, and the protection lid in the second position exposing the planar surface of the lens assembly of the first optical connector; and
      a cleaning element to clean at least one of the planar surface of the lens assembly and a planar surface of a lens assembly of a second optical connector that is to mate with the first optical connector, wherein the cleaning element is attached to the protection lid, the cleaning element cleans the at least one of the planar surfaces in response to the protection lid being moved from the first position to the second position, and the cleaning element cleans the at least one of the planar surfaces in response to the protection lid being moved from the second position to the first position.

2. The optical connector apparatus of claim 1, wherein the lens assembly of the first optical connector is configured without any recess in a side that faces the lens assembly of the second optical connector.

3. The optical connector apparatus of claim 1, wherein the planar surface is an inclined planar surface.

4. The optical connector apparatus of claim 3, wherein the inclined planar surface is inclined with respect to an axis of movement of the first optical connector when engaging with the second optical connector.

5. The optical connector apparatus of claim 1, wherein the cleaning element is actuated to move in response to mating engagement between the first and second optical connectors.

6. The optical connector apparatus of claim 1, wherein the lens assembly of the first optical connector has a lens cover that provides the planar surface.

7. The optical connector apparatus of claim 1, further comprising:
   the second optical connector, wherein the second optical connector further comprises a cleaning element to clean at least one of the planar surface of the lens assembly of the second optical connector and the planar surface of the lens assembly of the first optical connector.

8. The optical connector apparatus of claim 1, further comprising:
   a socket associated with the first optical connector, wherein the socket is to receive an integrated circuit chip having a lens assembly to engage with the lens assembly of the first optical connector.

9. The optical connector apparatus of claim 1, wherein the cleaning element is a renewable cleaning element that is to incrementally advance with each use of the cleaning element.

10. An optical connector comprising:
    a lens assembly having at least one lens and a surface through which light travels to communicate with the lens;
    a protection lid attached to the lens assembly, wherein the protection lid is moveable by an actuator between a first position and a second position, the protection lid in the first position covering the surface, and the protection lid in the second position exposing the surface; and
    a cleaning element to clean the surface, wherein the cleaning element is attached to the protection lid, the cleaning element cleans the surface in response to the protection lid being moved from the first position to the second position, and the cleaning element cleans the surface in response to the protection lid being moved from the second position to the first position.

11. The optical connector of claim 10, wherein the lens assembly is inclined with respect to an axis along which the optical connector is to travel to mate with another optical connector.

12. The optical connector of claim 11, further comprising:
    an optical fiber optically coupled to the lens; and
    a connector body through which the optical fiber extends, wherein the optical fiber has a curved portion in the connector body.

13. A method comprising:
    providing a lens assembly in a first optical connector, the lens assembly including at least one lens and a planar surface;
    arranging a protection lid attached to the lens assembly, wherein the protection lid is moveable by an actuator between a first position and a second position, the protection lid in the first position covering the planar surface of the lens assembly of the first optical connector, and the protection lid in the second position exposing the planar surface of the lens assembly of the first optical connector; and
    arranging a cleaning element in the first optical connector that is moveable to clean the planar surface of the lens assembly of the first optical connector or a planar surface of a lens assembly of a second optical connector, wherein the cleaning element is attached to the protection lid, the cleaning element cleans the at least one of the planar surfaces in response to the protection lid being moved from the first position to the second position, and the cleaning element cleans the at least one of the planar surfaces in response to the protection lid being moved from the second position to the first position.

14. The optical connector apparatus of claim 1, wherein the cleaning element is to clean the planar surface as the protection lid is moved from the first position to the second position or as the protection lid is moved from the second position to the first position.

15. The optical connector of claim 10, wherein the cleaning element is a renewable cleaning element that is to incrementally advance with each use of the cleaning element.

16. The optical connector of claim 10, wherein the lens assembly has a lens cover that provides the planar surface.

17. The optical connector of claim 10, further comprising a socket associated with the first optical connector, wherein the socket is to receive an integrated circuit chip having a lens assembly to engage with the lens assembly of the first optical connector.

18. The method of claim 13, wherein the cleaning element is a renewable cleaning element that is to incrementally advance with each use of the cleaning element.

19. The method of claim 13, further comprising:
cleaning the planar surface as the moveable protection lid is moved from the first position to the second position; or
cleaning the planar surface as the moveable protection lid is moved from the second position to the first position.

\* \* \* \* \*